US006962231B2

(12) United States Patent
Carlsson et al.

(10) Patent No.: US 6,962,231 B2
(45) Date of Patent: Nov. 8, 2005

(54) STEERING DEVICE FOR INDUSTRIAL TRUCK

(75) Inventors: Magnus Carlsson, Vikingstad (SE); Gert Précenth, Mjölby (SE); Sven-Eric Wernborg, Mjölby (SE)

(73) Assignee: BT Industries AB (SE)

( * ) Notice: Subject to any disclaimer, the term of this patent is extended or adjusted under 35 U.S.C. 154(b) by 0 days.

(21) Appl. No.: 10/325,359

(22) Filed: Dec. 19, 2002

(65) Prior Publication Data

US 2003/0121712 A1 Jul. 3, 2003

(30) Foreign Application Priority Data

Dec. 27, 2001 (SE) .............................................. 0104411

(51) Int. Cl.[7] ............................ B62D 1/14; B62D 51/04
(52) U.S. Cl. ...................................... 180/334; 180/19.2
(58) Field of Search ................................ 180/334, 19.1, 180/19.2, 19.3, 332; 280/775; 74/493

(56) References Cited

U.S. PATENT DOCUMENTS

| | | | | |
|---|---|---|---|---|
| 3,556,549 A | | 1/1971 | Hershman | 280/87 |
| 4,172,503 A | | 10/1979 | Ishioka et al. | 180/313 |
| 5,052,512 A | * | 10/1991 | Pakosh et al. | 180/329 |
| 5,067,581 A | * | 11/1991 | Nicol | 180/254 |
| 5,890,562 A | * | 4/1999 | Bartels et al. | 187/224 |
| 5,964,313 A | * | 10/1999 | Guy | 180/332 |
| 6,595,306 B2 | * | 7/2003 | Trego et al. | 180/19.2 |

FOREIGN PATENT DOCUMENTS

| | | | |
|---|---|---|---|
| BE | 707640 | 4/1968 | |
| DE | 199 08 832 | 3/1999 | B62D/5/00 |
| EP | 0 195 886 | 1/1986 | B62D/1/18 |
| GB | 960876 | 8/1960 | |

* cited by examiner

*Primary Examiner*—David R. Dunn
(74) *Attorney, Agent, or Firm*—Hayes Soloway P.C.

(57) ABSTRACT

A steering handle of a pallet truck is arranged over a battery box on the truck. The steering handle is journaled so that it is in a turnable relation to an arm about a journaling point. The arm is journaled so that it is pivotable around a second pivot point. By pivoting the arm laterally a position may be achieved where the handle is easily accessible from the side of the truck. The steering handle is pivotably arranged in the outer end of the arm in a pivot bearing that in turn is pivotable in the arm and parallel controlled in relation to the truck. Between the steering handle and the journal for the pivot movement detection means are arranged to detect the mutual turning that is then used to electronically/electrically turn the steered wheel of the truck.

10 Claims, 2 Drawing Sheets

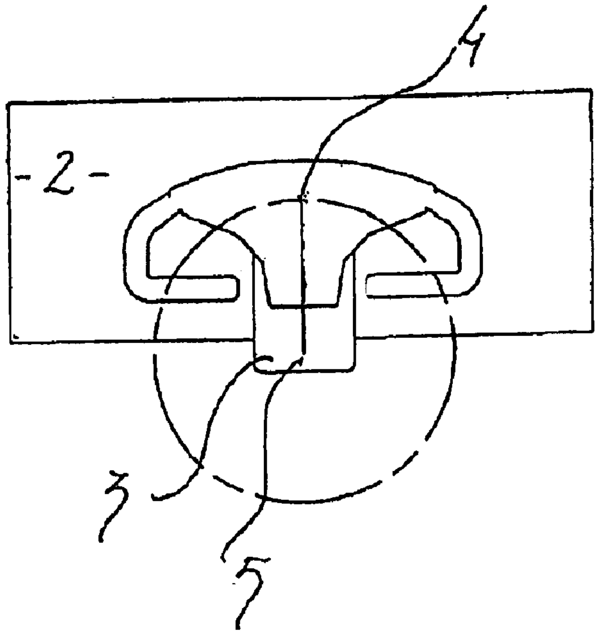
FIG. 1
FIG. 2
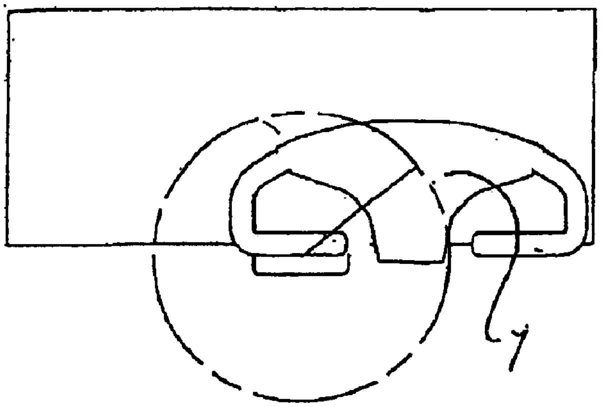
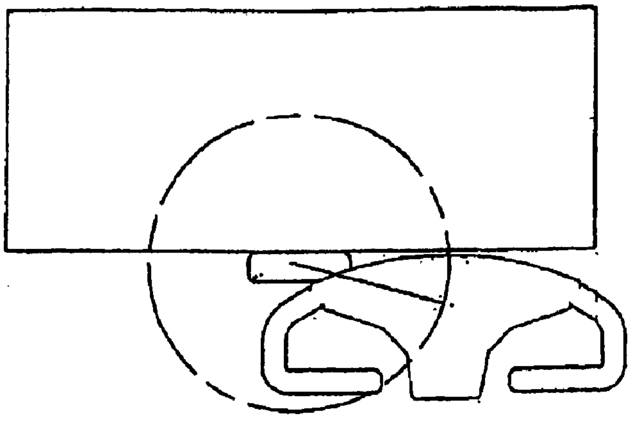
FIG. 3

STEERING DEVICE FOR INDUSTRIAL TRUCK

BACKGROUND OF THE INVENTION

Pallet Trucks are commonly used to allow the operator to pick up goods either in a container or on a pallet placed on the forks of the truck. This is done either by the driver standing on the floor next to the truck or on a special platform that is also used when moving the pallet truck. The truck can be arranged in such a way that the forks are located at its rear end, i.e., with the driver facing away from the forks. Even if the platform of the truck is low, the operator must repeatedly step on and off the truck, even for very small movements. In order to overcome this limitation, jogging buttons can be arranged on the sides of the truck. The jogging buttons allow the truck to be driven slowly forwards or backwards, but the user cannot steer the truck. Thus, the position of the truck can be adjusted, i.e., to lift a load on or off the truck. But, since the truck cannot be steered unless the operator steps onto the truck, the operation of the truck remains inefficient.

SUMMARY OF THE INVENTION

In one embodiment, the invention comprises a steering means, that has, for instance, a steering handle. The steering handle is movable from at least one central position to at least one or two lateral positions. Thus, it becomes possible for the operator to comfortably use the steering means or handle when driving the truck to and from a location on the truck's platform or a shorter move in which the operator walks beside the truck. When walking beside the truck, the steering means or handle can be easily reached because the steering means or handle are either located just inside the contour of the truck or extended outside the truck. Also, the steering means can be arranged at the end of an arm that can be locked in different positions. The steering means operates via a compact panel provided with a small wheel for the electronic or electrical transfer of the steering movements.

In another embodiment of the invention, the steering means is a steering handle arranged in the outer end of an arm that can be swiveled around an axle located at the front edge of the platform, preferably at its center. Thus, the operator can extend the arm straight forward to place the handle a comfortable distance from the front of the operator. By allowing the operator to swivel the arm to either side of the truck, the handle can be placed within comfortable reach for an operator walking along the side of the truck.

Generally, on pallet trucks, the batteries are arranged directly in front of the platform so that the operator is closest to the load being carried behind the operator on the forks and so that the weight is balanced on the truck's steering and driving wheel. In accordance with a further development of the invention, the pivot bearing of the arm is arranged at the front edge of the platform behind the battery and is pivotable rearwards so that it is possible to pivot the handle away from the battery box. Thus, the battery box is freely accessible from above thereby facilitating truck maintenance, i.e., the exchange of the battery.

In a further embodiment of the invention, the pivoting arm is coupled to the steering means or handle or its (zero-position) in such a way that the steering means or handle turns in the same direction in all possible arm positions. Thus, the steering instincts of the operator are facilitated and repositioning the truck is easier.

The coupling of the movements of the arm and the steering means or the handle may advantageously be achieved by a first gear or cog-wheel arranged so that it is rigidly connected with the steering means or journal of the steering handle.

Over the cog-wheel, a cog belt is arranged. The cog-belt is arranged over a second cog-wheel located concentrically with the bearing of the arm. The second cog-wheel is non-turnably connected to the truck. The steering movement is transferred from the steering handle to the steered wheel in an electronic way, e.g., a sensor in the handle.

When the arm is pivoted, the cog belt together with the cog wheels will serve as a parallel control, i.e., cogwheels of the same size in both places causes a parallel movement of the steering means or handle to be achieved without any further mechanical means being required.

Alternatively, the second cog wheel may be arranged in an upper end of the steering rod that either directly or via the cog wheels and cog belts transfers the steering movement to the driving wheel of the truck. Also, here, a parallel control of the steering means or handle is achieved with simple and low cost mechanical components, which not only result in great reliability but also prevents the device from being costly.

The arm can also be journaled in the upper end of a post fastened to the floor of the truck platform. This arrangement is particularly advantageous in trucks with a platform that adjusts in height so that the steering means or handle move vertically.

In order to lock the arm, and thereby the handle, a lock is arranged that can be freed with the touch of a button arranged in the handle.

Further advantages and characteristics of the invention are apparent from the claims and the following description of an exemplary embodiment shown in the enclosed drawings.

BRIEF DESCRIPTION OF THE FIGURES

FIGS. 1–3 show different handle positions for a truck according to the invention;

DETAILED DESCRIPTION OF THE INVENTION

Figure 4:
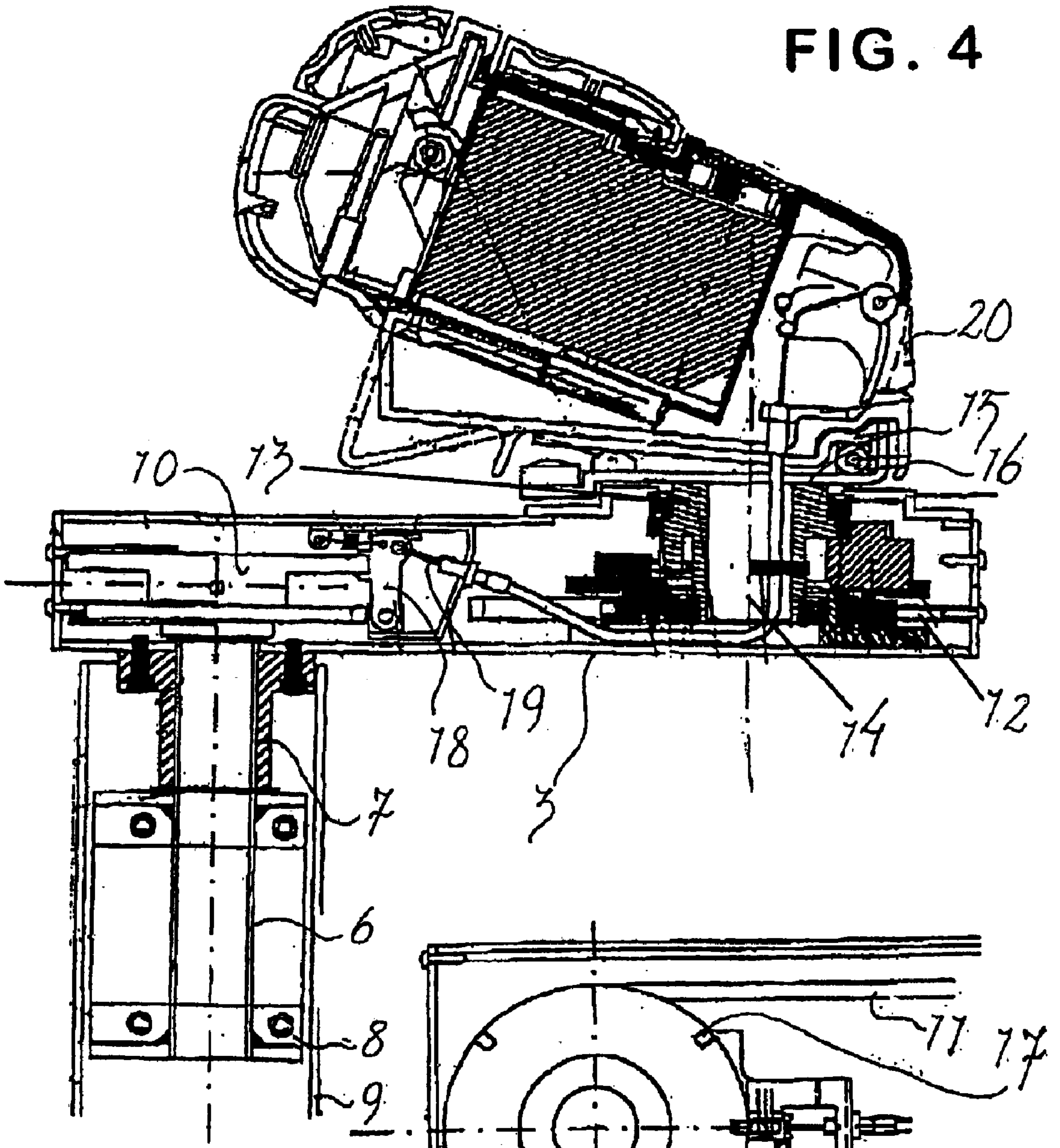
FIG. 4 shows a longitudinal cross section of the arm and handle.

FIG. 1 shows how a steering handle 1 for a truck is arranged centrally over the battery box 2 of the truck. The steering handle is journaled turnable in relation to an arm 3 around a journal point 4, while the arm in turn is journaled pivotable around a pivot point 5. By pivoting the arm laterally, the position shown in FIG. 2 can be achieved. In a similar way the arm can be pivoted to the other side of the truck.

FIG. 3 shows how the arm, by being pivoted further from the lateral steering positioning described in FIG. 2, places the steering handle in a service position behind the battery box so that the battery box is accessible from above.

FIG. 1 shows the steering handle in a position corresponding to a steering direction that is straight forward and steering is achieved by turning of the handle. When pivoting the arm between the different positions the steering handle is always transferred with its present steering angle, which is achieved by a mechanical device described below in greater detail with reference to FIG. 4.

In FIG. 4 the arm 3 is provided in the pivot end with a downwards protruding bushing 7 that is swivably arranged on a tube-shaped vertical axle 6. The tube-shaped vertical axle 6 is arranged in a vertical rectangular beam or pillar 9 located centrally behind and next to the battery box 2. The beam 9 is connected to the platform floor of the truck and can on similarly equipped trucks follow the movements up and down of the platform floor.

The tube-shaped axle 6 extends upwards into the arm 3, where a cog wheel 10 is non-turnably fastened to the axle 6. Over the cogwheel a cog belt 10 runs with its parts extending to the other end of the arm.

Figure 5:
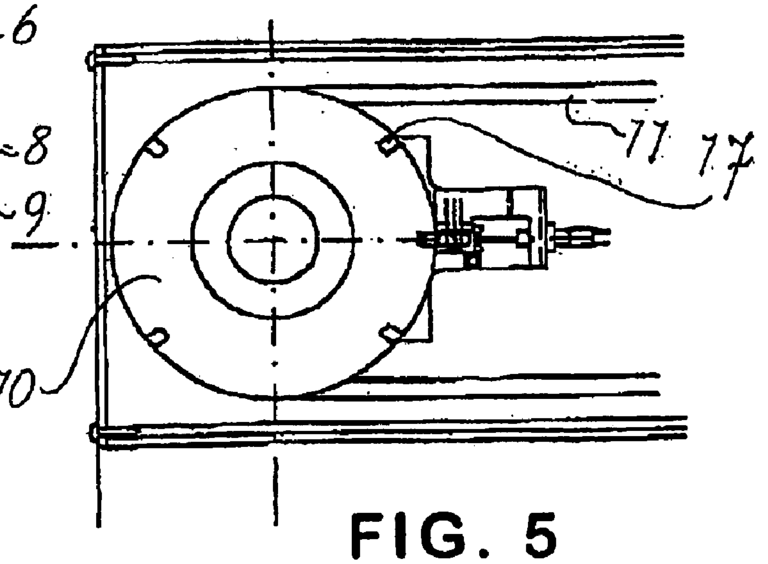
FIG. 5 is a vertical cross section of the arm and handle of FIG. 4.

In the other end of the arm 3, a tube shaped vertical axle 14 is fastened to the bottom side of the arm 3 and is essentially arranged inside the arm 3. A bushing 13 journaled on the axle 14, is on the upper side fastened to a plate 15. In one end of the plate 15, the handle 1 is pivotably journaled so that it is moveable in a vertical plane via a hinge-joint 16. The handle 1 is in this manner turnably journaled relative the arm. On the outside of the bushing, a cog wheel 12 is swivably journaled, and the cog belt 11 runs over this cog wheel. Thus, the cog wheels 10 and 12, will together with the cog belt 11 (FIG. 5) constitute the parallel control for the cog wheel 12. The cog wheel 12 will thereby always have the same position with respect to the length axis of the truck. By arranging between the cog wheel 12 and the bushing 13 coupled to the handle 1 an angle sensor, e.g., a potentiometer or an optical detector of teeth on a wheel, the steering movement or angle of the handle 1 can be obtained, and then by suitable servo means be transferred to the steered wheel of the truck.

The cog wheel 10 is provided with recesses 17 on the circumference. These recesses correspond to the positions in which one may wish to use lock 18 in the arm 3 to lock arm 18 in place. The lock 18 snaps into recesses 17. The lock 18, by a spring, biased towards the locking position and a wire 19 can be used to free the arm from its locking position and allow the arm 18 to pivot. The wire 19 runs from the lock to an actuation means 20 in the handle. The wire also runs through the tube-shaped axle 14 and therefore does not interfere with the steering mechanism of the handle 1.

Also, leads from the controls in the handle pass through the tube-shaped axle 14 as well as through the tube-shaped axle 6.

Since the center of the turning movement of the handle lies a distance in front of the grip, a tiller arm feeling is obtained in the steering which facilitates intuitive steering.

What is claimed is:

1. A steering device for a truck comprising:

a controller arranged moveably between a center middle position of the truck and at least one side position apart from the center middle position of the truck, wherein the truck can be controlled from the side position, and wherein the controller comprises a handle and an arm, the handle being moveably arranged about a journal point between the handle and the arm, and wherein the arm is pivotally mounted using cog wheels and a cog belt so that the direction of the handle is influenced by pivoting of the arm.

2. The steering device according to claim 1, wherein the controller is arranged in an outer end of the arm which is pivotally arranged centrally in the truck.

3. The steering device according to claim 1, further comprising a locking device that locks movement of the arm, the locking device being controlled from the handle.

4. The steering device according to claim 1, wherein the arm is pivotally mounted relative to the handle, and a center of pivotal movement of the arm is above a front edge of the platform.

5. The steering device according to claim 1, wherein turning movement of the handle is sensed electronically and used to steer the truck.

6. The steering device according to claim 1, wherein the arm is journaled in the upper end of a pillar that in turn is fastened to the truck platform.

7. A steering device for a truck comprising:

a controller arranged moveably between a center middle position of the truck and at least one side position apart from the center middle position of the truck, wherein the truck can be controlled from the side position, and wherein the controller comprises a handle and an arm, the handle being moveably arranged about a journal point between the handle and the arm, and wherein the handle can be entirely turned when steering, and the handle has the same steering orientation regardless of the handle's position on the arm.

8. The steering device according to claim 7, wherein a pivot point of the handle is situated a short distance in front of grips of the handle so that an arm feel similar to that of a tiller is achieved.

9. The steering device according to claim 7, wherein turning movement of the handle is sensed electronically and used to steer the truck.

10. The steering device according to claim 7, wherein the arm is journaled in the upper end of a pillar that in turn is fastened to the truck platform.

* * * * *